Dec. 25, 1928.

T. M. BRUECK

PHOTOGRAPHIC SHUTTER

Filed Dec. 4, 1926

INVENTOR
Theodore M. Brueck
BY
H. H. Simms
his ATTORNEY

Dec. 25, 1928.

T. M. BRUECK 1,696,264

PHOTOGRAPHIC SHUTTER

Filed Dec. 4, 1926

INVENTOR
Theodore M Brueck
BY
ATTORNEY

Dec. 25, 1928.  
T. M. BRUECK  
1,696,264  
PHOTOGRAPHIC SHUTTER  
Filed Dec. 4, 1926   6 Sheets-Sheet 4

INVENTOR  
Theodore M. Brueck  
BY  
his ATTORNEY

Dec. 25, 1928.  1,696,264
T. M. BRUECK
PHOTOGRAPHIC SHUTTER
Filed Dec. 4, 1926   6 Sheets-Sheet 5

INVENTOR
Theodore M. Brueck
BY
H. H. Simms
his ATTORNEY

Dec. 25, 1928.

T. M. BRUECK 1,696,264

PHOTOGRAPHIC SHUTTER

Filed Dec. 4, 1926   6 Sheets-Sheet 6

INVENTOR
Theodore M. Brueck
BY
ATTORNEY

Patented Dec. 25, 1928.

1,696,264

UNITED STATES PATENT OFFICE.

THEODORE M. BRUECK, OF ROCHESTER, NEW YORK, ASSIGNOR TO ILEX OPTICAL COMPANY, OF ROCHESTER, NEW YORK, A CORPORATION OF NEW YORK.

PHOTOGRAPHIC SHUTTER.

Application filed December 4, 1926. Serial No. 152,563.

The present invention relates to photographic shutters and more particularly to the type in which there is employed an exposure mechanism, a master member, and a connection between the master member and the exposure mechanism for effecting the opening and the closing of the shutter. An object of this invention is to provide a construction in which the number of parts are reduced to a minimum. Another object of this invention is to provide a construction in which a single detaining member has direct engagement with the master member and direct engagement with the actuating lever thus eliminating the additional lever heretofore required to be interposed between the actuating lever and the master member. Another object of the invention is to provide on the detaining member a latch through which the actuating lever moves the detaining member out of detaining position, said latch being controlled by a part moved by the exposure mechanism, preferably a part rigid with a part of the exposure mechanism, to hold the latch out of the path of the actuating lever when the latter is moved to effect cooperation between the master member and the detaining means. Another object of the invention is to so construct the shutter that an outside peripheral surface on the controlling member may be employed for controlling the detaining means, this having been heretofore accomplished by an inside surface which has made the assembling of the shutter a difficult one. Still another object of the invention is to improve the connection between the master member and a retarding mechanism which retards the movement of the master member. Still another object of the invention is to provide a pivoted latch on the master member which slips off the retarding mechanism, permitting the latter to return to normal position under the action of its own spring after the shutter has been closed and before the next operation of the master member against the action of the spring of the latter. Still another object of the invention is to provide a kick off device in connection with a pivoted latch on the master member, insuring positive disconnection between the master member and the retarding mechanism. A still further object of the invention is to provide a photographic shutter having two retarding mechanisms, one acting through the other and each having its own spring, a connection between one of the retarding mechanisms and the master member being provided to permit both of the retarding mechanisms to return to their normal positions after the shutter has been closed and before the master member is again actuated against the action of its own spring. A still further object of the invention is to provide a photographic shutter in which two retarding mechanisms are employed having an adjustable connection between them and an adjustable connection between one of them and the master member, both of said adjustable connections being controlled by a common controller.

To these and other ends, the invention consists of certain parts and combinations of parts, all of which will be hereinafter described, the novel features being pointed out in the appended claims.

In the drawings:

Fig. 10ª is a detail view of the primary retarder showing the lever broken away.

Figures 1, 2:
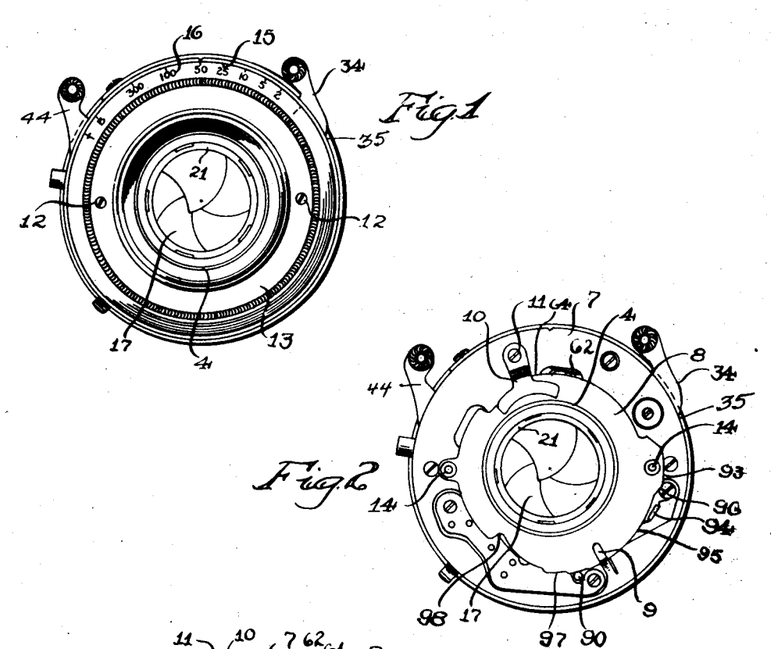
Fig. 1 is a face view of a photographic shutter constructed in accordance with this invention.
Fig. 2 is a face view with the dial plate removed and the controlling member shown in its adjusted position for obtaining a retarded instantaneous exposure.
Figure 3:
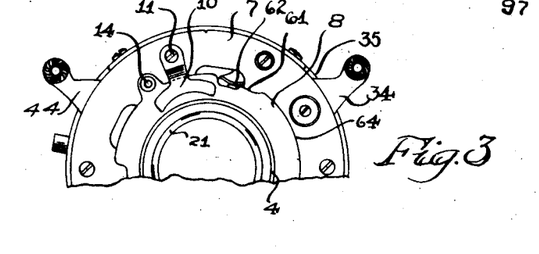
Fig. 3 is a fragmentary face view showing the controlling member adjusted to obtain time exposure.
Figure 4:
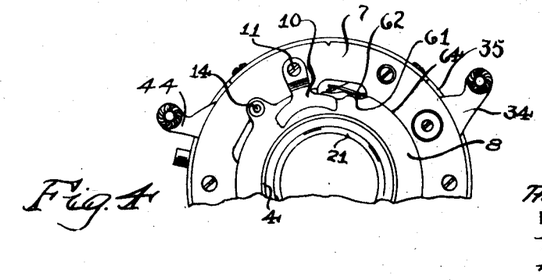
Fig. 4 is a similar view showing the controller ring adjusted to obtain bulb exposure.

In the illustrated embodiment of the invention there is employed a casing having a central aperture or opening and formed in three parts, a rear, a central and a front part. The rear part 1 carries the iris diaphragm of any suitable construction and as this does not enter into the present invention it is not described nor shown in detail. This rear part has a rearwardly projecting flange 3 which serves as a means for attaching a shutter to a camera and for mounting one of the lens elements (not shown) all of which are known in this art. The central part has a flange 4 surrounding the aperture and internally threaded to receive the front lens element. This central part also has an outer annular flange 5, both of said flanges 4 and 5 projecting from a ring 6 forming the main part of the central element of the shutter casing. The flange 4 projects beyond the flange 5 and about the same is secured a cover member 7, see Figs. 2, 3 and 4, on which the controlling member 8 for the shutter is secured by two overhanging securing devices 9 and 10, the securing device 9 being in the form of a lip struck up from the cover member 7 and the securing device 10 being detachable and held to the cover member by a screw 11, the outer surface of the flange 4 acting as a guide or bearing for the controlling member or ring 8. Through two screws 12 there is secured to the controlling ring 8, a dial disk 13, the ring having openings 14 in which the screws 12 are anchored. This dial disk has on the face thereof the usual graduations 15 provided with the usual characters 16 for indicating the different adjustments of the shutter. The dial disk 13 acts as an outer cover plate for covering the controlling ring and other parts of the shutter which are exposed through the interior cover member 7.

Figure 14:
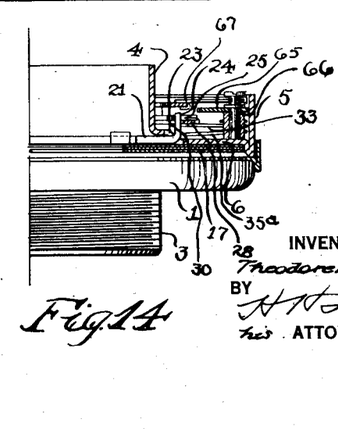
Fig. 14 is a section on the line 14—14, Fig. 11.

The blade or exposure mechanism of the shutter may be of any desired construction. In this instance, a plurality of blades 17 is employed, each provided with a slot 18 fitting over pins 19 projected from the rear face of the annular member 6 and each also pivoted at 20 to an exposure ring 21 which turns in a depressed portion 22 on the rear face of the annular member 6. The portion 6 of the casing has a slot 23 through which an operating projection 24 on the exposure ring 21 extends, (see Fig. 14).

Figure 15:
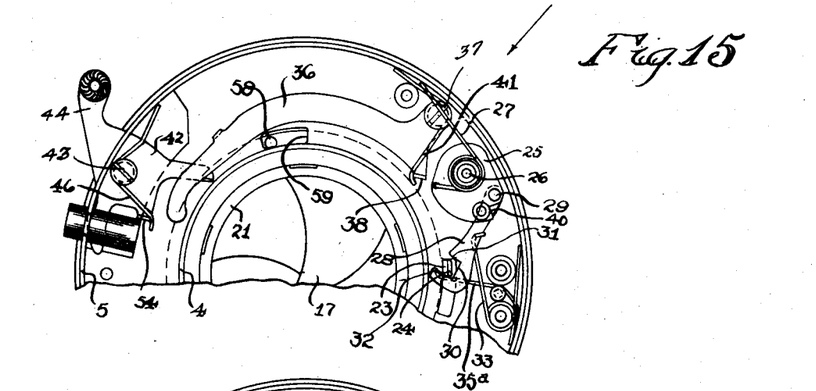
Fig. 15 is a fragmentary interior view showing the connection between the actuating lever and the master member when the latter is in its normal position.
Figure 16:
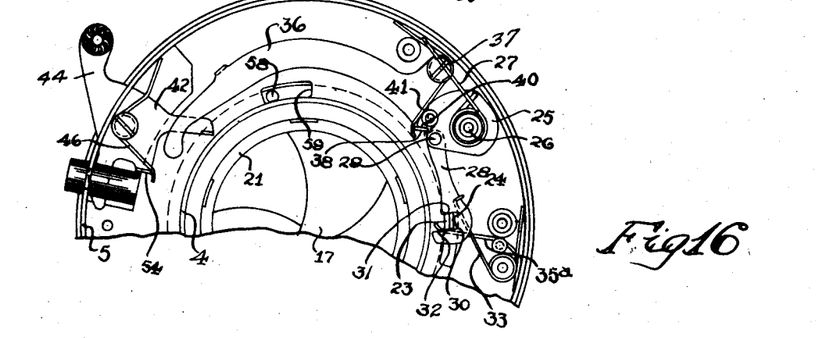
Fig. 16 is a similar view showing the master member in set position.
Figure 17:
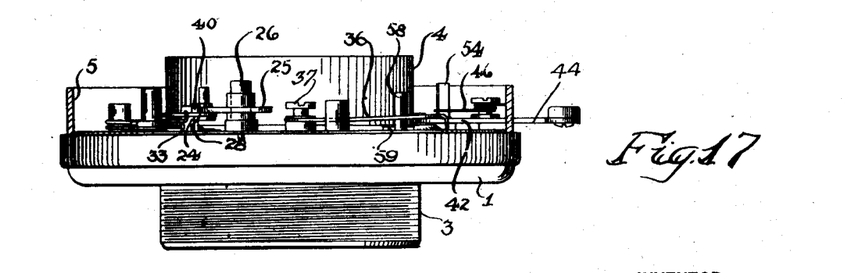
Fig. 17 is a view of the parts illustrated in Fig. 15 looking in the direction of the arrow in said figure with a part of the casing broken away.

For actuating the shutter there is employed a master or motor member 25, see Figs. 15 and 16, which, in this instance, is pivoted at 26 and normally held in one position by a master or motor spring 27. This master member, in this instance, connects with the blade mechanism through a lost motion connection which permits the master member to be moved in the direction to store energy in the spring 27 without affecting the operation of the blade mechanism and then to move in the other direction to effect the opening and the closing of the shutter blades. In this instance, this lost motion connection embodies a latch 28 pivoted at 29 at an eccentric point on the master lever and having a notch 30 near one end providing two shoulders 31 and 32. A spring 33 holds the latch 28 in a position where the projection 24 is received within the recess 30 when the master member is in its unset or normal position. The master member, in this instance, is moved to store energy in the spring 27 thereof by means of an arm 34 rigid with the master member and projecting out through a slot 35 in the casing for manual operation. When this lever arm 34 is depressed, the shoulder 30 will pass the projection 24 and the exposure or blade mechanism will not be affected, being held in its closed position by a spring 35ª acting thereon. But upon the return movement of the master member 25 under the action of its motor spring 27, the shoulder 31 which has been moved through the eccentric connection 29 of the latch 28 with the master member to a point above the projection 24, will engage said projection 24 and move the blade mechanism to open the shutter. After the blades are opened, this shoulder 31 slips off the projection 24 and the latch 28, due to its eccentric connection 29 with the master member 25, is pulled upwardly to bring the shoulder 32 in engagement with the projection 24 and in this way effect, through the spring of the master member, the rapid closing of the shutter.

With the end in view of holding the master member in its set position with the spring 27 under tension, and the latch 28 positioned to effect the opening of the shutter blades, a detaining means is provided, see Figs. 15 and 16, comprising, in this instance, a lever 36, pivoted at 37 within the casing and having a laterally projecting nose or projection 38 adapted to engage a stop or shoulder 40 on the master member 25. A spring 41 acts on this detaining lever 36 in a direction to move said detaining member normally to detaining position.

The release of the detaining member may be effected in any suitable manner. In this instance, there is provided an actuating member 42 pivoted at 43 within the casing and having an operating portion 44 extending to the outside of the casing. This actuating lever has a laterally extending projection 45 which is adapted to directly engage with one side of the detent 36, in order to shift such detent against the action of the spring 41 to move the shoulder 38 thereof out of direct engagement with the shoulder 40 on the master member and permit the master member to return to its normal position and thereby effect the opening and the closing of the shutter blades. A spring 46 acts on the actuating lever to normally return the latter to its normal position.

Figure 6:
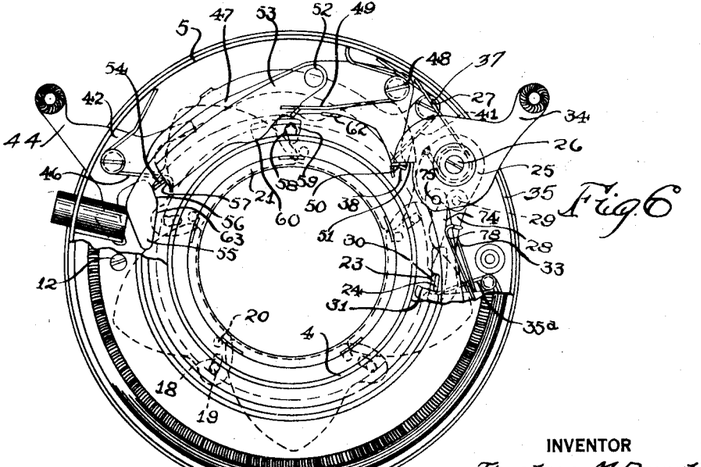
Fig. 6 is a similar view showing the detent in the position it occupies when the shutter is open.

For holding the master or motor member 25 in a position where the blades will be maintained in an open position, there is employed a detaining means comprising, in this instance, a detent 47 pivoted at 48 and moved to detaining position under the action of the spring 49. This detaining member has a lateral projection 50 adapted to engage directly the shoulder 51 on the master member 25 when the shutter blades 17 are in open position as illustrated in Fig. 6. On the detaining member is pivoted at 52 a latch 53 which is also engaged by the spring 49. After the lever 36 has been operated to release the master member from its set position the spring 27 of the master lever moves the latter, when the shutter is adjusted for any other exposure than instantaneous, until the shoulder 51 on the master lever directly engages the shoulder 50 on the detent 47 and the parts move to the position shown in Fig. 6. At this time the end of the latch 53 lies in the path of a lateral projection 54 on the actuating lever 42, so that upon the next depression of the actuating lever, the projection 54 will engage the end of the latch 53 and shift the detent 47 on the pivot 48, thus submitting the master member 25 to the action of the spring 27, permitting the latter to move to close the blades. While the shutter is in a set position, the end 55 of the detent 47 directly engages the projection 54 and holds the detent 47 out of the path of the master member, but, with the actuation of the lever 42, the projection 54 moves out of the path of the end 55 of the detent 47 and the latter carries the shoulder 56 on the detent 47 into the path of the shoulder 54, thereby preventing the complete return movement of the actuating lever 42 as illustrated in Fig. 6.

Figure 5:
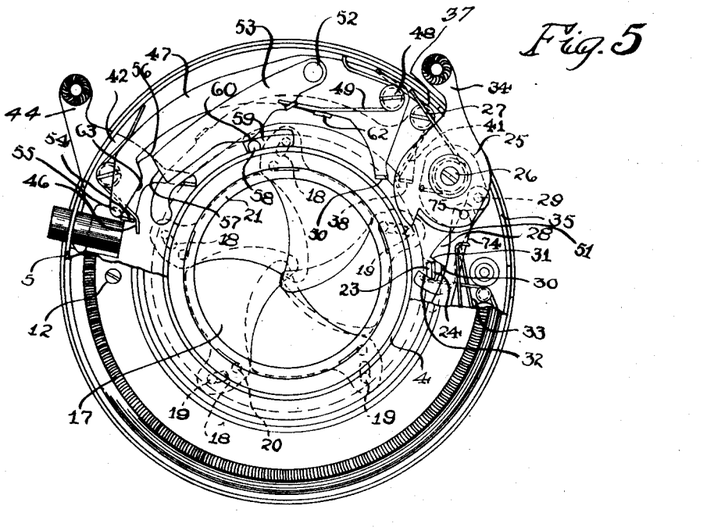
Fig. 5 is a face view of the shutter showing the front cover plate and dial broken away and illustrating the detent in the position it occupies when the detent is adjusted for time exposures and the shutter is closed.

When the shutter blades are closed, the latch 53 has its end 57 held out of the path of the projection 54 on the actuating lever 42. This is effected, in this instance, by a pin or projection 58 rigid with and projecting laterally from the exposure ring 21 through a slot 59 in the portion 6 of the casing of the shutter and cooperating with a portion 60 of the latch 53 to hold the latch against movement under the action of the spring 49. As the shutter blades open, the ring 21 turns and carries a projection 58 out of the path of the latch 53 so that the end 57 of the latch may move into the path of the projection 54, whereby, when the actuating lever 42 is again actuated after its movement to free the master member from its set position, the projection 54 will engage the end 57 of the latch 53 and shift the detent 47 on its pivot 48 to move the projection 50 out of the path of the shoulder 51 on the master lever, permitting the blades to close and the parts to assume the positions shown in Fig. 5.

This control of the latch 53 on the detent 47 through the exposure mechanism, that is, the projection 58 on the exposure ring 21, makes it possible to provide a time detent 47 which is directly engaged by the actuating lever 42 and directly engages the master member 25. Heretofore, an intermediate lever has been required between the master lever and the time detent in order to control the latch on the time detent. As a result, the cost of production of the shutter is less, and, in addition, it is possible to control the time detent from an outside surface 61 on the controlling cam 8 through means of a projection 62 extending laterally through the time detent 47.

Figure 10:
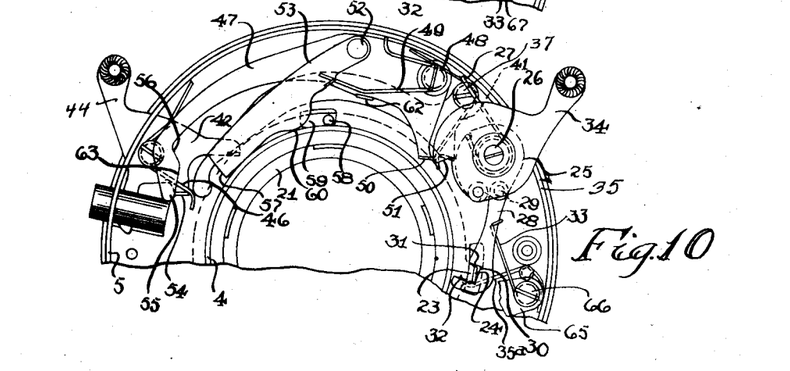
Fig. 10 is a fragmentary interior view showing the position of the parts when the shutter is open on bulb exposure.
Figure 10A:
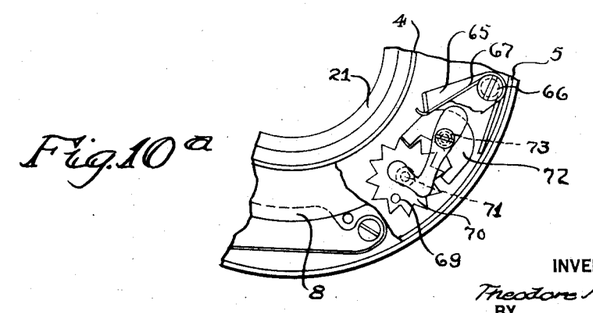

Bulb exposures are obtained by holding the projection 62 through the cam surface 61 so that the detent 47 cannot partake of a complete movement but only has a short movement in order that the projection 50 thereon may engage the projection 51. Furthermore, the projection 54 on the actuating lever cannot pass into engagement with the shoulder 56, but instead engages an inclined shoulder 63 as shown in Fig. 10, whereby when the actuating lever 42 is released the projection 54 will push on the inclined shoulder 63 and shift the detent to carry the projection 50 out of the path of the shoulder 51 on the master member 25 to effect the closing of the shutter.

Figure 7:
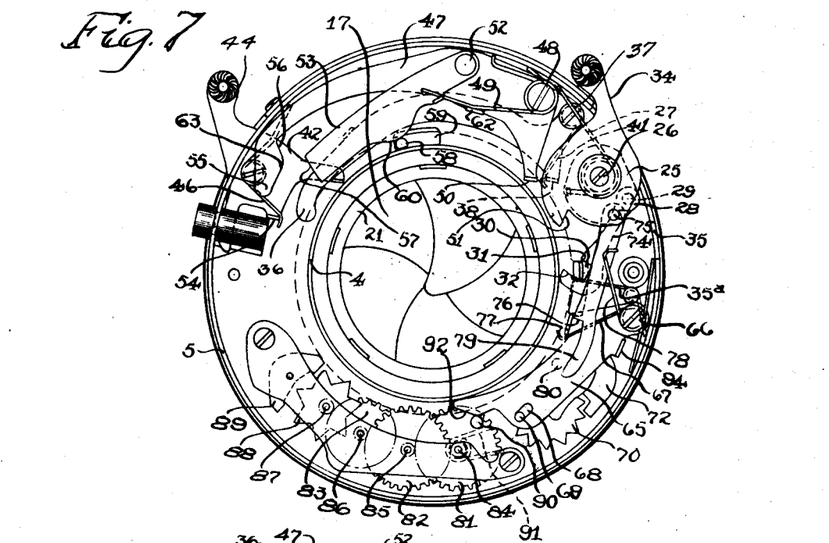
Fig. 7 is a view of the shutter, with the cover plate removed, illustrating the position of the parts when the shutter is closed and the retarding mechanism is adjusted for the slowest instantaneous exposures.
Figure 8:
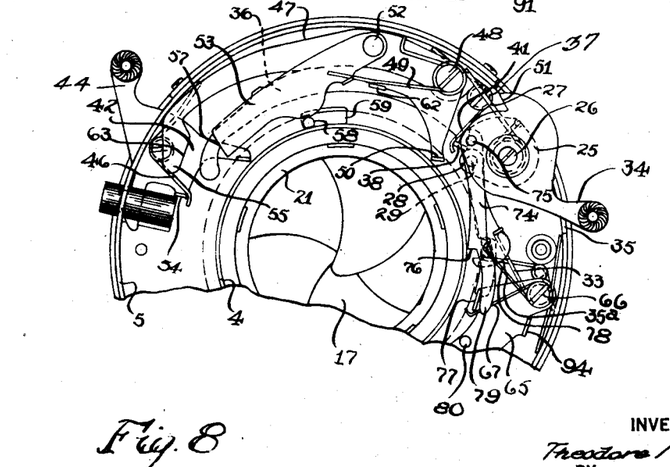
Fig. 8 is a fragmentary interior view showing the master member in a set position with the pivoted catch on the master member in position to engage the abutment on the primary retarding mechanism.
Figure 9:
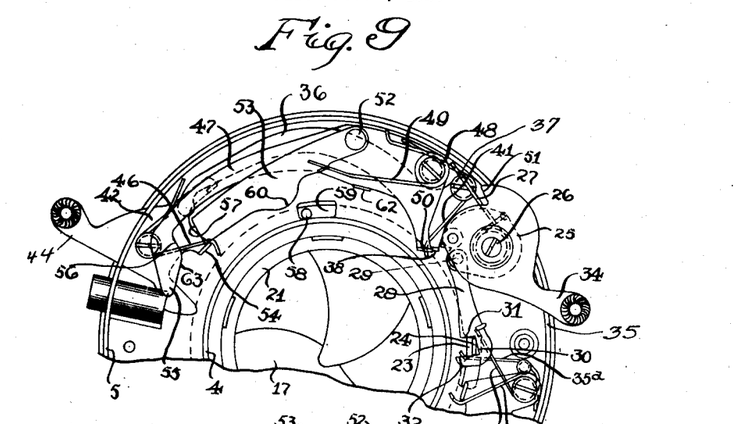
Fig. 9 is a fragmentary interior view showing the position of the parts when the master member is released for bulb exposure.
Figure 11:
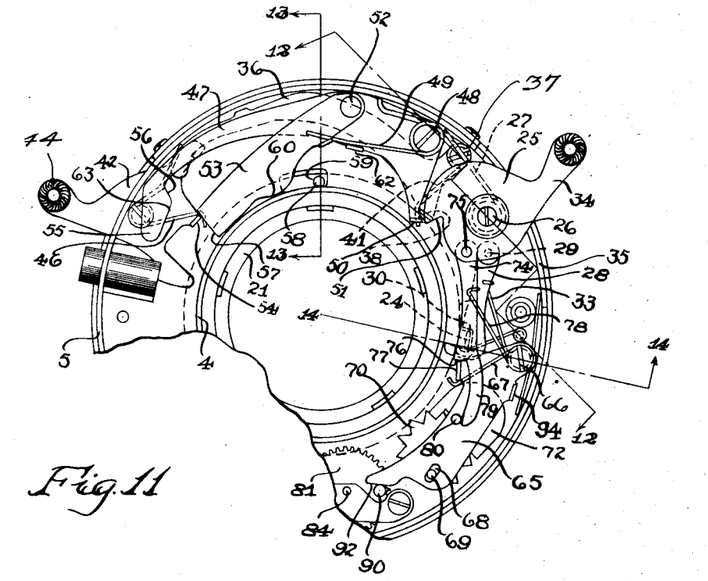
Fig. 11 is a fragmentary interior view showing the position of the parts when the shutter is operating on instantaneous exposures, the cooperation between the retarding mechanism and the connection with the master member being illustrated in the positions the parts occupy just before the kick-off occurs.
Figure 12:
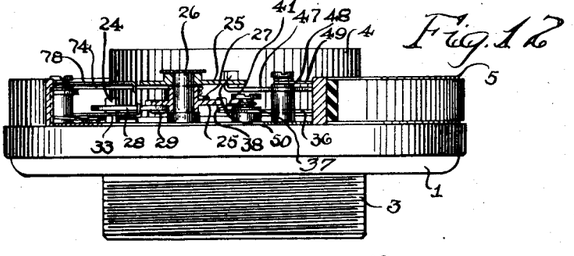
Fig. 12 is a section on the line 12—12, Fig. 11.
Figure 13:
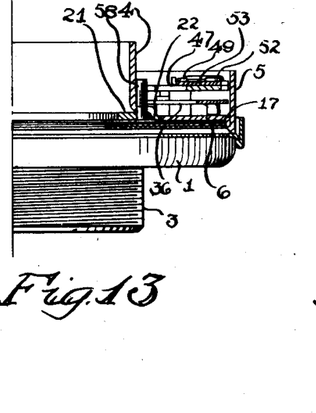
Fig. 13 is a section on the line 13—13, Fig. 11.

Instantaneous exposures are effected by moving the surface 64 in engagement with the projection 62 on the time detent 47, so that the time detent is held out of the path of the projection 54 on the actuating lever 42 permitting said actuating lever to move without affecting the time detent, so as to shift the lever 36 in order to permit the master member 25 to move without any interference from the time detent, first to open the shutter and then to effect the closing, as illustrated in Figs. 7, 8 and 11.

With the end in view of retarding the action of the master member, there may be provided a retarding mechanism comprising in this instance a lever 65 pivoted at 66 and having a spring 67 acting thereon normally to hold the lever in one position. This lever has near its free end a slot 68 in which a pin 69 operates. This pin 69 is eccentrically mounted on a toothed or star wheel 70 mounted to turn about an axis 71 and engaged by an anchor 72 pivoted at 73. The spring 67 moves the lever 65 in one direction while a connection is provided between the lever 65 and the master member which moves the lever 65 against the action of the spring.

The connection between the master member 25 and the retarding lever 65 is a novel one and forms one of the features of this invention. It comprises a latch 74 pivoted at 75 on the master member 25 at a point eccentric to the axis of the latter and having a shoulder 76 on one side arranged to cooperate with a lateral projection or abutment 77 formed on the lever 65 of the retarding mechanism, a spring 78 acting on said latch in order to hold the shoulder 76 toward the projection 77. Beyond the shoulder 76, the latch has an extension 79 which is adapted to cooperate with the lateral projection 80 formed on the lever 65. As will be seen by referring to Figs. 7, 8 and 11, when the master member 25 is in normal position, the shoulder 76 lies out of engagement with the projection 77 on the retarding lever 65 and when the master member 25 is moved to set position, the shoulder 76 moves above the projection 77 as shown in Fig. 8, the side of the extension 79 of the latch 74 cooperating with the projection 77. When in the position shown in Fig. 8, the distance between the shoulder 76 and the projection 77 is such that the master member 25 may have a lost motion under the action of its spring to complete the opening of the shutter aperture before the shoulder 76 engages the projection 77, although the blades still continue their opening movements beyond the field of the aperture of the shutter, the shutter aperture being open completely before the shoulder 51 on the master lever engages the projection 50 on the detent 47. As the shoulder 76 engages the projection 77 on the retarding lever 65, the latter begins to move under the action of the spring 27 of the master lever, said spring being stronger than the spring 67 which acts on the swinging member 65 of the retarding mechanism. The movement of the swinging member 65 continues until the projection 80 on the swinging member 65 engages the extension 79 on the latch 74 and shifts the latch 74 on its pivot 75 to carry the shoulder 76 out of engagement with the projection 77 on the swinging member 65 of the retarding mechanism. This slip off occurs during the first part of the closing movement of the blades and just about the time that the blades start their movement across the aperture of the shutter, so that the retarding device acts on the master lever 25 while the blades are moving beyond the area of the exposure aperture. Of course, when the lever 65 is moved through the master member 25, the toothed wheel 70 is oscillated and this oscillating movement is retarded through the anchor 72.

There may be employed a secondary retarding device for obtaining still slower speeds in the movement of the master lever 25 and to this end there is employed, a train of wheels 81, 82 and 83 geared together by pinions 84, 85 and 86, the gear meshing with a pinion 87 with which a toothed or star wheel 88 turns, the latter being operated upon by a pivoted anchor 89. The wheel 81 has a lateral projection 90 and a spring 91 acts on this wheel to hold the projection 90 in spaced relation to but in the path of a bevelled end 92 on the lever 65, as shown in Fig. 7, so that the primary retarding mechanism formed by the lever 65, gear 70 and anchor 72 may have its action retarded by the secondary retarding mechanism formed by the train of gears, star wheel 88 and anchor 89. If the secondary retarding mechanism has its projection 90 in its extreme upper position, then the maximum retarding action on the master member 24 is obtained.

The retarding action on the master lever through the retarding mechanisms may be controlled to nicety to obtain either the highest speed in the shutter action, where neither of the retarding mechanisms operates, or graduated speeds up to the greatest retarding action obtainable. This may be effected through the controlling member 8. This controlling member has a surface 93 adapted to cooperate with a lug 94 formed on the retarding lever 65 to hold the projection 77 of the retarding lever out of the path of the shoulder 76 on the latch 74, so that the master member 25 may move to effect the opening and the closing of the blades without being retarded by either of the retarding mechanisms. While the surface 93 engages the projection 94, a surface 95 on the controlling member engages the pin 90 on the secondary retarding mechanism so the latter is held out of the path of movement of the retarding lever 65. The two surfaces 93 and 95 are concentric with the axis of turning of the controlling member 8, but the surface 95 is longer than the surface 93. Between the surfaces 93 and 95, there is provided a cam surface 96, which is adapted to cooperate with the projection 94 in order to shift the lever 65 on its pivot, so as to vary the retarding action of the primary retarding mechanism, due to the fact that the shoulder 76 will engage the projection 77 for a short period only. At this time the surface 95 is still in engagement with the pin 90 of the secondary retarding mechanism. The adjustment of the controller 8 carries the surface 95 opposite the projection 94 on the primary retarding mechanism and this surface 95 is so positioned that it permits a free movement of the retarding lever 65. However, at this time, the pin 90 is still in engagement with the surface 95 so that the retarding action on the master lever is imposed entirely through the entire movement of the primary retarding mechanism without any interference by the secondary retarding mechanism. It will thus be seen that the action of the primary retarding mechanism on the master lever may be varied to obtain different speeds independently of the secondary retarding mechanism. The controller 8 also has a cam portion 97 which gradually approaches the center of turning of the controller 8 to a point 98. This cam portion cooperates with the projection 90 after the latter passes off the concentric portion 95 and permits the portion 90 to move gradually more and more into the path of the end 92 of the retarding lever 65 under the action of the spring 91, until the portion 98 is reached. The nearer that the portion 90 moves to the portion 92, the greater will be the retarding action of the secondary retarding mechanism upon the primary retarding mechanism. This adjustment of the projection 90 gives a graduation of speeds between the slowest obtainable with primary retarding mechanism and the slowest obtainable with the combined action of the two retarding mechanisms. The primary retarding mechanism also provides a means interposed between the master lever and the secondary retarding mechanism which makes it possible to return the stop 90 on the secondary mechanism to retarding position after each operation of the shutter or after the blades of the shutter have been closed. This shutter does not require the shifting of entire retarding mechanism with the setting of the shutter, as the master member has a slip off connection with the primary retarding mechanism permitting the latter to return to normal position and, the primary retarding mechanism permits the secondary retarding mechanism to return to normal position under the action of the spring of the secondary retarding mechanism.

From the foregoing it will be seen that there has been provided a photographic shutter in which the time detent directly engages the master member and also the actuating lever so that the usual intermediate lever in shutters of this type is eliminated and a surface on the outer perimeter of the controlling ring may be employed for controlling the time detent. This result is secured by providing a connection between the exposure mechanism and a latch on the time detent which prevents the time detent being shifted by the actuating lever when the latter is moved to store energy in the spring of the master member. A simple means for accomplishing this purpose is a rigid part on the exposure or blade ring acting on the detent latch. A novel lost motion slip off connection is provided between the master member and the retarding mechanism which insures the slip off action permitting the retarding mechanism to return to normal position before the master member is again actuated so that the retarding mechanism is not required to be set before the shutter can be operated. This result is obtained in a simple manner by a latch pivotally connected to the master member and having a shoulder engaging the retarding mechanism together with a part engaged by the retarding mechanism to insure the slip off. A secondary retarding mechanism is employed which also is not required to be set when energy is stored in the master member spring. Both retarding mechanisms are so controlled that greater accuracy in the timing of the graduated speeds of the shutter is attained.

What I claim as my invention and desire to secure by Letters Patent is:

1. In a photographic shutter, the combination with an exposure mechanism, a master member, a connection between the master member and the exposure mechanism for effecting the opening and the closing of the shutter by the movement of the master member in one direction, a pivoted detent for holding the exposure mechanism against closing, a latch pivoted to the detent, and an actuating lever controlling the movement of the master lever to bring the detent into detaining position, of means moved by the exposure mechanism for holding the latch out of cooperative relation with the actuating lever when the shutter is closed, so that the actuating lever may be moved to control the master member in order to bring the detent into detaining position, said latch controlling means being moved by the exposure mechanism to cause the latch to move into the path of the actuating lever upon the opening of the shutter, so that the detent may be moved out of detaining position through such latch upon the next movement of the actuating lever.

2. In a photographic shutter, the combination with an exposure mechanism, a master member, a connection between the master member and the exposure mechanism for effecting the opening and the closing of the shutter by the movement of the master member in one direction, a pivoted detent for holding the exposure mechanism against closing, a latch pivoted to the detent and an actuating lever controlling the movement of the master member to bring the detent into detaining position, of a part rigid with one of the parts of the exposure mechanism and engaging the latch to hold the latch out of cooperation with the actuating lever when the shutter is closed so that the actuating lever may be moved to control the master member in order to bring the detent into detaining position, said rigid part being moved with the exposure mechanism upon the opening of the shutter to effect the movement of the latch into the path of the actuating lever so that the detent may be moved out of detaining position through such latch upon the next movement of the actuating lever.

3. In a photographic shutter, the combination with an exposure mechanism, a master member, a connection between the master member and the exposure mechanism for effecting the opening and the closing of the shutter by the movement of the master member in one direction, an actuating lever having connection with the master lever to control the movement of the latter for effecting the opening of the shutter, a pivoted detent having direct engagement with the master member to hold the latter against movement when the shutter is open, said detent also having direct engagement with the actuating lever through which the detent is permitted to move into detaining engagement with the master member, and a latch pivoted to the detent and movable into and out of the path of the actuating lever, of means interposed between the exposure member and the latch for effecting the movement of the latter on the detent, said means being constructed to hold the detent out of the path of the actuating lever when the latter is moved to control the movement of the master member into connection with the detaining means and to effect the movement of the latch into the path of the actuating lever when the exposure mechanism is open.

4. In a photographic shutter, the combination with an exposure mechanism having a rotary blade controlling ring, a master member, a connection between the master member and the exposure mechanism for effecting the opening and the closing of the shutter by a movement of the master member in one direction, a pivoted detent for engaging the master member to hold the exposure mechanism against closing, a latch pivoted to said detent, and an actuating lever controlling the movement of the master member to bring the detent into detaining position, of means rigid with the controlling ring of the exposure mechanism and engaging the latch when the shutter is closed to hold the latch out of the path of the actuating lever, said rigid means moving with the opening of the shutter to permit the latch to move into the path of the actuating lever so that the latter may shift the detent out of engagement with the master member to effect the closing of the shutter.

5. In a photographic shutter, the combination with an exposure mechanism, a master member, and a connection between the master member and the exposure mechanism for effecting the opening and closing of the shutter by a movement of the master member in one direction, of a pivoted detent for directly engaging the master member to hold the exposure mechanism against closing, a latch mounted on the detent, an actuating lever controlling the movement of the master member and also directly engaging the detent to hold the latter out of detaining position, means for engaging the latch to hold it out of the path of the actuating lever when the shutter is closed, but effecting the movement of the latch into the path of the actuating lever when the shutter is open, and a rotary controlling ring rotatable about the axis of the shutter and having a surface on the outer periphery thereof for directly engaging with a portion of the detent to control the position of said detent.

6. In a photographic shutter, the combination with an exposure mechanism, a master member, a connection between the master member and the exposure mechanism for effecting the opening of and the closing of the shutter, and a retarding mechanism, of latch pivotally connected to the master member and having a shoulder thereon, an abutment on the retarding mechanism for engagement by the shoulder, and a kick off means for moving the shoulder on the latch out of engagement with the abutment on the retarding mechanism.

7. In a photographic shutter, the combination with an exposure mechanism, a master member, a connection between the master member and the exposure mechanism for effecting the opening and closing of the shutter, and a retarding mechanism embodying a pivoted member, of a latch pivotally connected to the master member and having a shoulder thereon, an abutment on the pivoted lever of the retarding mechanism for engagement by the shoulder, and a rigid portion on the lever of the retarding mechanism for engaging the latch to kick the shoulder off the abutment during the movement of the lever of the retarding mechanism by the latch.

8. In a photographic shutter, the combination with an exposure mechanism, a master member, a connection between the master member and the exposure mechanism for effecting the opening and the closing of the shutter, a retarding mechanism, and a spring for moving the retarding mechanism to normal position, of a connection between the master member and the retarding mechanism, embodying a latch pivotally connected to the master member and having a shoulder thereon which slips out of connection with the retarding mechanism after the master member has moved to effect the opening and the closing of the shutter.

9. In a photographic shutter, the combination with an exposure mechanism, a master member, a spring for moving the master member in one direction, a connection between the master member and the exposure mechanism for effecting the opening and the closing of the shutter upon the movement of the master member in one direction under the action of the spring and a retarding mechanism, of a latch pivotally connected to the master member and shifted by the latter into operative connection with the retarding mechanism upon the movement of the master member to store energy in the spring, said latch having a slip off connection with the retarding mechanism becoming ineffective during the movement of the master member under the action of its spring, and a spring for returning the retarding device to normal position after the retarding mechanism has been released by the latch.

10. In a photograph shutter, the combination with an exposure mechanism, a master member, a connection between the master member and the exposure mechanism for effecting the opening and the closing of the shutter, a retarding mechanism having a pivoted lever, and a spring for moving said lever in one direction, of a latch pivotally connected to the master member and having a shoulder thereon and an extension beyond the shoulder, and two abutments on the lever of the retarding mechanism, one for engagement by the shoulder and the other for engagement with the extension to kick the shoulder off the first mentioned abutment.

THEODORE M. BRUECK.